(12) United States Patent
Stählin et al.

(10) Patent No.: US 11,917,409 B2
(45) Date of Patent: Feb. 27, 2024

(54) VEHICLE-TO-X COMMUNICATION APPARATUS AND METHOD FOR ACHIEVING A SAFETY INTEGRITY LEVEL IN VEHICLE-TO-X COMMUNICATION

(71) Applicant: Continental Teves AG & Co. OHG, Frankfurt am Main (DE)

(72) Inventors: Ulrich Stählin, Nuremberg (DE); Marc Menzel, Nuremberg (DE)

(73) Assignee: Continental Teves AG & Co. oHG (DE)

( * ) Notice: Subject to any disclaimer, the term of this patent is extended or adjusted under 35 U.S.C. 154(b) by 563 days.

(21) Appl. No.: 17/270,563

(22) PCT Filed: Aug. 8, 2019

(86) PCT No.: PCT/DE2019/200097
§ 371 (c)(1),
(2) Date: Feb. 23, 2021

(87) PCT Pub. No.: WO2020/048569
PCT Pub. Date: Mar. 12, 2020

(65) Prior Publication Data
US 2021/0345114 A1   Nov. 4, 2021

(30) Foreign Application Priority Data
Sep. 6, 2018   (DE) ..................... 10 2018 215 126.1

(51) Int. Cl.
*H04W 12/106*   (2021.01)
*H04W 4/12*   (2009.01)
(Continued)

(52) U.S. Cl.
CPC ........... *H04W 12/106* (2021.01); *H04W 4/12* (2013.01); *H04W 4/40* (2018.02); *H04W 12/03* (2021.01)

(58) Field of Classification Search
CPC ....... H04W 12/106; H04W 4/12; H04W 4/40; H04W 12/03; H04W 4/44; H04L 63/123
See application file for complete search history.

(56) References Cited

U.S. PATENT DOCUMENTS 8,314,718 B2   11/2012   Muthaiah et al.
9,100,418 B2   8/2015   Karnik
(Continued)

FOREIGN PATENT DOCUMENTS

DE   102009037864 A1   6/2010
DE   102010046843 A1   6/2011

OTHER PUBLICATIONS

Bian et al., "Security in Use Cases of Vehicle-to-Everything Communications", Sep. 2017, IEEE 86th Vehicular Technology Conference, pp. 1-5 (Year: 2017).*
(Continued)

*Primary Examiner* — Kenneth W Chang
(74) *Attorney, Agent, or Firm* — Buchanan Ingersoll & Rooney PC

(57) ABSTRACT

A vehicle-to-X communication apparatus including: a reception device to receive a vehicle-to-X message; a first electronic computation device to calculate a hash value for a received vehicle-to-X message; and a second electronic computation device to generate a new vehicle-to-X message using data included in the received vehicle-to-X message and to calculate a hash value for the generated vehicle-to-X message. The first electronic computation device is designed in accordance with a higher safety integrity level than the second electronic computation device, and a comparison device to make a comparison between the hash value for the received vehicle-to-X message and the hash value for the generated vehicle-to-X message. The vehicle-to-X communication apparatus further processes the data from the received vehicle-to-X message depending on a result of the
(Continued)

comparison. Also disclosed are a corresponding method and the use of the apparatus in a vehicle or an infrastructure device.

20 Claims, 2 Drawing Sheets

(51) Int. Cl.
*H04W 4/40* (2018.01)
*H04W 12/03* (2021.01)

(56) References Cited

U.S. PATENT DOCUMENTS

| | | | |
|---|---|---|---|
| 2005/0190619 A1* | 9/2005 | Wakiyama | G11C 7/24 |
| | | | 365/201 |
| 2008/0208408 A1* | 8/2008 | Arbitmann | B60W 10/20 |
| | | | 701/41 |
| 2012/0150392 A1 | 6/2012 | Stahlin et al. | |
| 2015/0058625 A1 | 2/2015 | Jose et al. | |
| 2015/0089236 A1 | 3/2015 | Han et al. | |
| 2017/0207922 A1 | 7/2017 | Ando et al. | |
| 2019/0149342 A1* | 5/2019 | Fynaardt | H04L 41/5041 |
| | | | 713/156 |
| 2019/0312738 A1* | 10/2019 | Barrett | H04L 9/3247 |

OTHER PUBLICATIONS

Rigazzi et al., "Optimized Certificate Revocation List Distribution for Secure V2X Communications", Sep. 2017, IEEE 86th Vehicular Technology Conference, pp. 1-7 (Year: 2017).*
International Search Report and Written Opinion for International Application No. PCT/DE2019/200097, dated Nov. 13, 2019, with partial English translation, 7 pages.
International Search Report and Written Opinion for International Application No. PCT/DE2019/200097, dated Nov. 13, 2019, 11 pages.
German Search Report for German Application No. 10 2018 215 126.1, dated May 13, 2019, with partial English translation, 8 pages.

* cited by examiner

VEHICLE-TO-X COMMUNICATION APPARATUS AND METHOD FOR ACHIEVING A SAFETY INTEGRITY LEVEL IN VEHICLE-TO-X COMMUNICATION

CROSS REFERENCE TO RELATED APPLICATIONS

This application is the U.S. National Phase Application of PCT International Application No. PCT/DE2019/200097, filed Aug. 8, 2019, which claims priority to German Patent Application No. 10 2018 215 126.1, filed Sep. 6, 2018, the contents of such applications being incorporated by reference herein.

FIELD OF THE INVENTION

The present invention relates to a vehicle-to-X communication apparatus and to a method for achieving a safety integrity level in vehicle-to-X communication.

BACKGROUND OF THE INVENTION

The launch of serially produced vehicle-to-X communication is currently in the pipeline. In particular, this involves vehicles transmitting vehicle-to-X messages at certain intervals or also upon certain events, said messages including, for example, information about speed, position, route, acceleration or particular events such as breakdowns or emergency braking maneuvers. The current relevant standards are IEEE802.11(p), IEEE1609, SAE 2735, SAE 2945 and ETSI ITS-G5. In addition, new 3GPP standards are currently being drafted for cellular V2X (C-V2X).

Vehicle-to-X communication in accordance with a required safety integrity level, in particular in accordance with an Automotive Safety Integrity Level (ASIL), is the state of the art, e.g. with corresponding AUTOSAR modules. A drawback to the current state of the art is that a vehicle-to-X communication apparatus does not currently allow classification into a required safety integrity level in particular if, for reasons of cost savings, the used hardware and software does not as such support a corresponding classification. As a result, there may only be limited trust in the integrity of received vehicle-to-X messages.

SUMMARY OF THE INVENTION

An aspect of the invention is a vehicle-to-X communication apparatus and a method that satisfy the requirements for a required safety integrity level and are able to be implemented with as little complexity as possible.

An aspect of the invention relates to a vehicle-to-X communication apparatus comprising:
 a reception device designed to receive a vehicle-to-X message,
 a first electronic computation device designed to calculate a hash value for a received vehicle-to-X message in particular by means of a first hash value determination device,
 a second electronic computation device designed to generate a new vehicle-to-X message using data included in the received vehicle-to-X message and to calculate a hash value for the generated vehicle-to-X message in particular by means of a second hash value determination device, wherein the first electronic computation device is designed in accordance with a higher safety integrity level than the second electronic computation device, and
 a comparison device designed to make a comparison between the hash value for the received vehicle-to-X message and the hash value for the generated vehicle-to-X message, wherein
 the vehicle-to-X communication apparatus is designed to further process the data from the received vehicle-to-X message depending on a result of the comparison.

An aspect of the invention is based on the idea of ensuring the quality of the data in accordance with a required higher safety integrity level by checking incoming vehicle-to-X data by means of an electronic computation device designed in accordance with the required safety integrity level of the vehicle-to-X communication. Expediently, the hash value for the received vehicle-to-X message and the hash value for the generated vehicle-to-X message are calculated by means of an identical and/or diverse method. In particular the implementation of the method for generating the hash values can be designed to be diverse. The hash value for the received vehicle-to-X message and/or the hash value for the generated vehicle-to-X message are in particular one-to-one mappings, determined by means of the SHA256 hash function or the MD5 hash function, for example.

One advantage of the invention is that the process of receiving vehicle-to-X messages allows classification into a required safety integrity level, in particular in accordance with an Automotive Safety Integrity Level (ASIL), it being possible to use hardware or software that do not need to be comprehensively ASIL-certified, i.e. is able to be implemented with existing hardware or software in principle. Advantageously, as a result, a required safety integrity level for the functional safety, e.g. ASIL B, of the entire vehicle-to-X communication apparatus in particular in the reception path and thus the vehicle-to-X communication can as such be made possible.

According to one embodiment, the data is further processed by the vehicle-to-X communication apparatus only if a result of the comparison indicates a match between the hash value for the received vehicle-to-X message and the hash value for the generated vehicle-to-X message. "Further process" is to be understood in particular to mean that the data is further provided to and used by resources of the first and/or second computation device and/or is transmitted to at least one further vehicle apparatus, e.g. a driver assistance system, for processing or using the data.

According to a further development, the received vehicle-to-X message is discarded if the result of the comparison does not indicate a match. Alternatively or additionally, a diagnosis for finding the cause of the error can be performed.

According to a further development, the first electronic computation device is designed in accordance with an ASIL B, C or D safety integrity level, preferably in accordance with ASIL B. The second electronic computation device is designed according to an embodiment in accordance with an ASIL QM safety integrity level, in particular if the first electronic is designed in accordance with ASIL B.

Advantageously, the second computation device of the vehicle-to-X communication apparatus can therefore be designed as an ASIL QM unit and does not need to be implemented e.g. in accordance with an ASIL B classification. The vehicle-to-X messages or the information on which they are based can nevertheless be provided in accordance with ASIL B quality. Accordingly, for an implemented communication stack, comparably cheaper software or hardware and/or a smaller development cost is/are possible.

In principle, the hardware and/or software of the vehicle-to-X communication apparatus can alternatively be designed substantially entirely in accordance with the required safety integrity level, although this incurs higher costs and could limit the availability of the components.

According to one embodiment, the second electronic computation device is designed to implement or carry out a vehicle-to-X communication protocol stack (also referred to below as a vehicle-to-X or V2X communication stack or V2X stack) and to process the received vehicle-to-X message by means of the vehicle-to-X communication stack in particular in order to obtain the data included in the received vehicle-to-X message. The vehicle-to-X communication protocol stack is designed in particular in accordance with an ASIL QM safety integrity level.

According to a further development, the second electronic computation device is designed to generate the generated vehicle-to-X message using the data from the received vehicle-to-X message by means of the vehicle-to-X communication stack. The vehicle-to-X message is generated using the data from the received vehicle-to-X message in particular in accordance with the provisions of at least one standard, such as IEEE, SAE and ETSI. Alternatively or additionally, for the generation of the new vehicle-to-X message, a further implemented vehicle-to-X communication protocol stack of the second electronic computation device can be provided, for example in order to achieve parallel processing of incoming messages and those to be generated.

According to a further development, the first electronic computation device is designed to store the hash value for the received vehicle-to-X message in a data memory. According to one embodiment, the data memory is dimensioned such that data can be stored for about 200 ms at a maximum rate of incoming vehicle-to-X messages.

According to one embodiment, the second electronic computation device is designed to store the data from the received vehicle-to-X in a further data memory. According to a further development, the second electronic computation device is designed to store the data from the received vehicle-to-X message in the further data memory only if the result of the comparison indicates a match between the hash value for the received vehicle-to-X message and the hash value for the generated vehicle-to-X message. Furthermore, the second electronic computation device can be designed to store the hash value for the generated vehicle-to-X message in the further data memory.

According to a further development, the further data memory is designed as a database for managing data of the vehicle-to-X communication.

Expediently, the vehicle-to-X communication apparatus is designed to make the comparison between the hash value for the received vehicle-to-X message and the hash value for the generated vehicle-to-X message by means of the first computation device and/or the second computation device.

The reception device is expediently designed to transmit the received vehicle-to-X message to the first electronic computation device. According to one embodiment, the first electronic computation device can be included in the reception device or can be at least in part separate from the reception device.

The first electronic computation device is expediently designed to transmit the received vehicle-to-X message to the second electronic computation device after at least the hash value for the received vehicle-to-X message has been calculated. Alternatively or additionally, the reception device can be designed to provide the received vehicle-to-X message to the first electronic computation device and the second electronic computation device. The parallel processing possible in this way could result in a more efficient use of time.

The second electronic computation device is expediently designed to transmit the hash value for the generated vehicle-to-X message to the first electronic computation device for the comparison between the hash value for the generated vehicle-to-X message and the hash value for the received vehicle-to-X message, the first electronic computation device being designed to carry out the comparison by means of the comparison device. Expediently, the comparison device has a safety integrity level that matches the first electronic computation device. This also applies in particular to the data memory and/or the first hash value determination device.

According to a further development, the first electronic computation device is designed to transmit the result of the comparison to the second electronic computation device. Expediently, if the hash values match, information indicating the match between the hash values to the second electronic computation device is accordingly transmitted, and if the hash values do not match, information indicating a mismatch between the hash values to the second electronic computation device is accordingly transmitted. For example, a specified bit for indicating the result of the comparison can be transmitted, a value of "1" indicating a match between the hash values, and a value of "0" indicating a mismatch between the hash values. The values "1" and "0" can be coded such that errors in transmission can be recognized.

According to one embodiment, the first electronic computation device is designed to determine an identifier, in addition to the hash value for the received vehicle-to-X message, on the basis of the received vehicle-to-X message, and in particular to also store said identifier in the data memory. The identifier can advantageously be used in order to relocate an already stored hash value for a determined received vehicle-to-X message for the comparison, in particular if the hash value as such is not already sufficient for this purpose. The identifier is generated from information from the vehicle-to-X message itself, as is also the hash value.

According to one embodiment, the second electronic computation device is designed to determine an identifier for the generated vehicle-to-X message, in addition to the hash value for the generated vehicle-to-X message, and in particular to also store said identifier in the further data memory. The hash value for the generated vehicle-to-X message and the identifier for the generated vehicle-to-X message are expediently both transmitted to the first electronic computation device. Since the identifiers are as such generated from the vehicle-to-X messages on which they are based, the identifier for the generated vehicle-to-X message can advantageously be successfully used to describe a storage location for the hash value for the received message only if the generated vehicle-to-X message and the received vehicle-to-X message match at least on the basis of the information used to create the identifiers.

According to one embodiment, the vehicle-to-X communication apparatus is designed to check incoming vehicle-to-X data only for the vehicle-to-X messages that have been ascertained to be relevant to the receiving vehicle or infrastructure device. Expediently, comparably few relevant vehicle-to-X messages can be discarded. This allows resources to be saved, in particular computing power and memory.

According to a further development, the vehicle-to-X communication apparatus is designed to verify the relevance of an incoming vehicle-to-X message, in particular by checking the time stamp thereof and/or position information, included in said message, for a transmitter of the vehicle-to-X message. Expediently, the time stamp is checked by a comparison with the current time, it being possible to discard vehicle-to-X messages having a time stamp indicating that a specified age has been exceeded. Advantageously, the use of a sequence number is thus not necessary for vehicle-to-X messages since vehicle-to-X messages typically include all the data necessary for implementing the described procedure.

In particular, for each of the first electronic computation device and the second electronic computation device, a separate microcontroller or processor or a region of a die or chip of a microcontroller or processor can be provided, the different regions of the die or chip being used to implement e.g. the different safety integrity levels accordingly. According to a further development, the first and/or the second electronic computation device can also be part of the reception device or be included therein.

According to one embodiment, the second electronic computation device is implemented by means of a cellular modem chip (cellular modem) or a NAD ("network access device"), in particular having an integrated processor, the cellular modem being designed in particular in accordance with an ASIL QM classification.

According to one embodiment, the first computation device is implemented by means of a microcontroller.

According to one embodiment, the reception device is designed as a transceiver, which in particular supports the IEEE 802.11p standard and/or a mobile communication standard (for example, C-V2X or LTE-V2X).

An aspect of the invention also relates to the use of the vehicle-to-X communication apparatus in a vehicle or an infrastructure device. The vehicle can be, for example, a motor vehicle, in particular a passenger motor vehicle, a load-carrying motor vehicle, a motorcycle, an electric motor vehicle, a hybrid motor vehicle, a water vehicle or an aircraft.

An aspect of the invention further relates to a method for achieving a safety integrity level in vehicle-to-X communication and in particular to be carried out by an embodiment of the vehicle-to-X communication apparatus according to the invention, comprising the following steps:

receiving a vehicle-to-X message by means of a reception device,
calculating a hash value for the received vehicle-to-X message by means of a first electronic computation device,
generating a new vehicle-to-X message using data included in the received vehicle-to-X message, by means of a second electronic computation device,
calculating a hash value for the generated vehicle-to-X message by means of the second electronic computation device, wherein the first electronic computation device is designed in accordance with a higher safety integrity level than the second electronic computation device,
making a comparison between the hash value for the received vehicle-to-X message and the hash value for the generated vehicle-to-X message by means of a comparison device,
using the data from the received vehicle-to-X message for further processing, depending on a result of the comparison.

Further preferred embodiments of the method according to the invention can be derived from the description of the embodiments of the vehicle-to-X communication apparatus according to the invention.

According to a further aspect of the invention, the apparatus according to the invention is designed to carry out a method according to at least one of the above-mentioned embodiments.

In a further development of the indicated vehicle-to-X communication apparatus, the specified apparatus comprises at least one memory and one processor. In this case, the specified method is stored in the form of a computer program in the memory, and the processor is intended for carrying out the method when the computer program is loaded into the processor from the memory.

According to a further aspect of the invention, a computer program comprises program-coding means in order to carry out all the steps of one of the specified methods when the computer program is executed on a computer or one of the specified apparatuses.

According to a further aspect of the invention, a computer program product contains program code that is stored on a computer-readable data medium and carries out one of the specified methods when executed on a data processing device.

BRIEF DESCRIPTION OF THE DRAWINGS

Certain particularly advantageous embodiments of the invention are specified in the dependent claims. Further preferred embodiments can also be derived from the following description of example embodiments based on drawings.

In the schematic drawings.

DETAILED DESCRIPTION OF THE PREFERRED EMBODIMENTS

Figure 1:
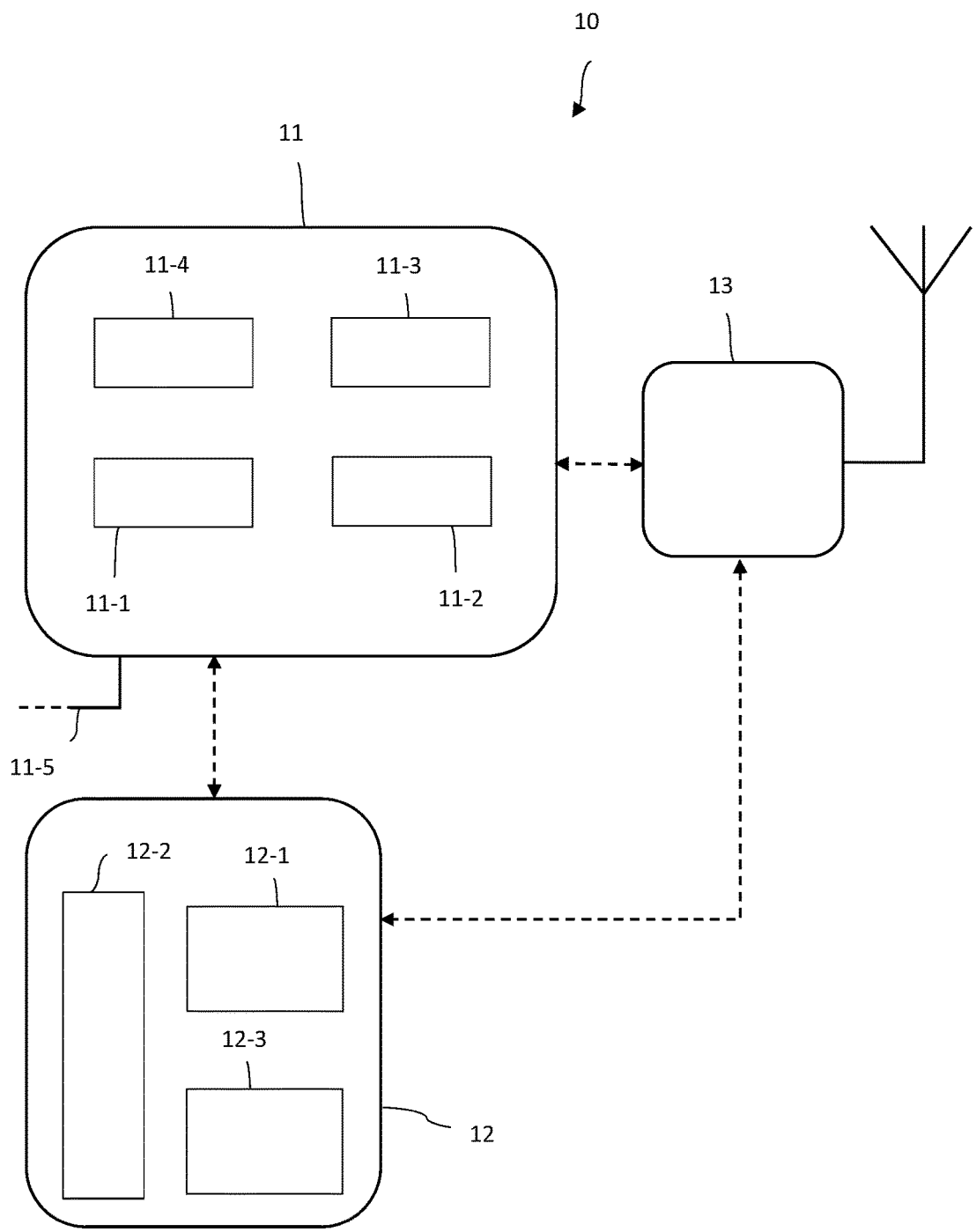
FIG. 1 shows an example embodiment of a vehicle-to-X communication apparatus according to the invention.

FIG. 1 shows an example embodiment of a vehicle-to-X communication apparatus 10 according to the invention. By way of example, the vehicle-to-X communication apparatus 10 comprises: a reception device 13 which has an antenna designed to receive a vehicle-to-X message; a first electronic computation device 12 which is designed, by means of a hash value determination device 12-1, to calculate a hash value for a received vehicle-to-X message and to store the hash value in a data memory 12-2; and a second electronic computation device 11. The second electronic computation device 11 is designed to obtain the data from the received vehicle-to-X message by means of a vehicle-to-X communication stack 11-1 and to use said data to generate a new vehicle-to-X message by means of the vehicle-to-X communication stack 11-1. By using a hash value determination device 11-2, the second electronic computation device 11 is designed to calculate a hash value for the generated vehicle-to-X message.

By way of example, the first electronic computation device 12 is designed in accordance with an ASIL B safety integrity level, and the second electronic computation device 11 is designed in accordance with an ASIL QM safety integrity level.

Using the hash value for the generated vehicle-to-X message, the first electronic computation device 12 is designed, by means of a comparison device 12-3, to make a comparison between the hash value for the received vehicle-to-X message, which is stored in the data memory 12-2, and the hash value for the generated vehicle-to-X message.

The vehicle-to-X communication apparatus 10 is further designed to further process the data depending on a result of said comparison. According to said example embodiment, the vehicle-to-X communication apparatus 10 can be designed, if the hash values match, to store the data from the received vehicle-to-X message in a data memory 11-3 of the second electronic computation device, the data memory being designed in particular as a database, and/or to perform processing by means of vehicle-to-X application programs 11-4 and/or to provide the data to further vehicle systems by means of a vehicle network 11-5, e.g. a data bus, such as CAN, Ethernet or Flexray in particular. If the comparison indicates a mismatch, the vehicle-to-X communication apparatus 10 can be designed to perform a diagnosis and/or to discard the data.

Figure 2:
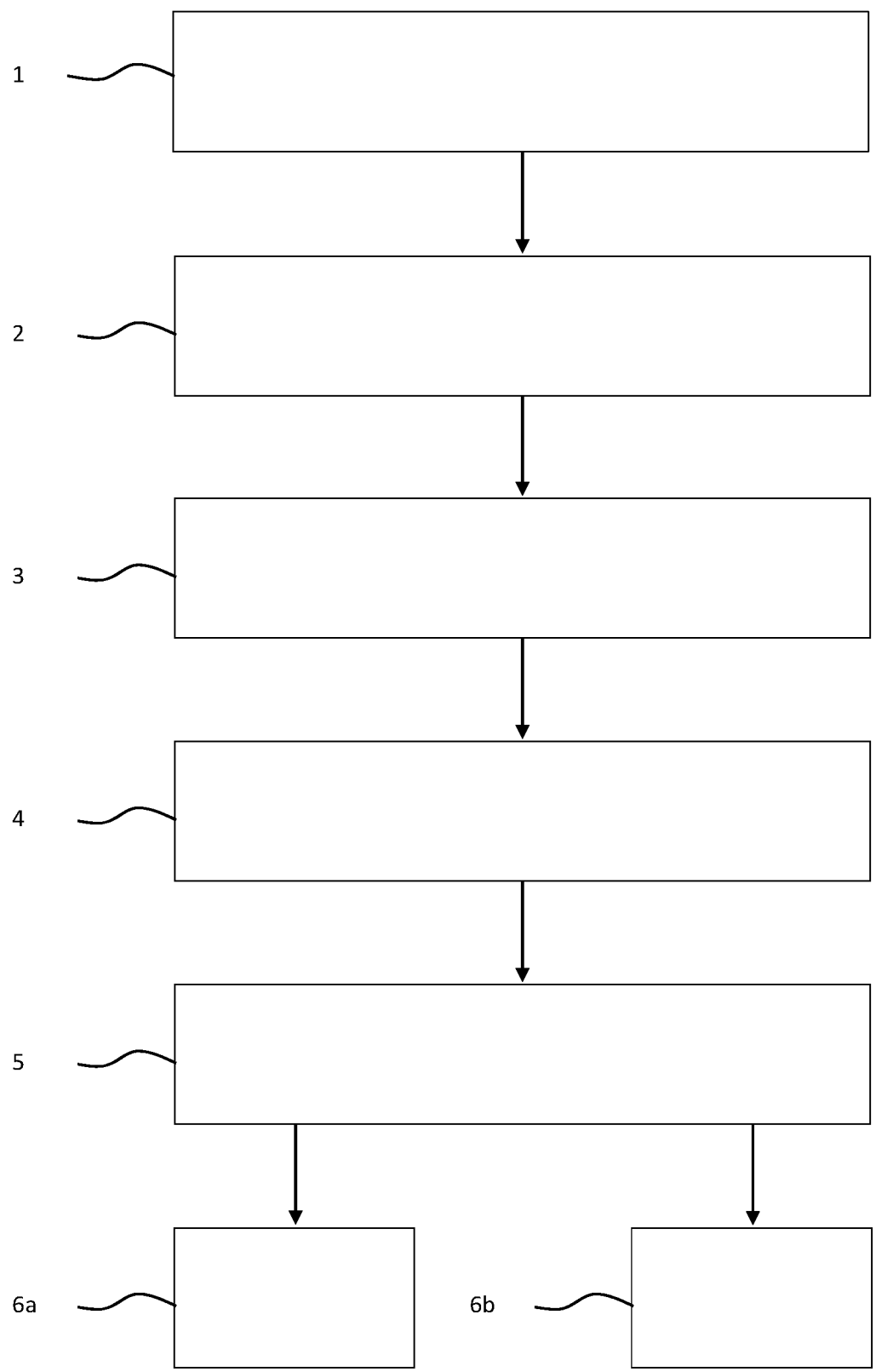
FIG. 2 shows an embodiment of the method according to the invention.

FIG. 2 shows one embodiment of the method according to the invention to be carried out by the vehicle-to-X communication apparatus 10 according to FIG. 1. In a step 1, a vehicle-to-X message is received by the reception device 13 and then transmitted to a first computation device 12, which generates, in a step 2, a one-to-one hash value for the received vehicle-to-X message by means of a hash value determination device 12-1. The hash value is then stored in a data memory 12-2 of the first computation device 12. The received vehicle-to-X message is transferred from the first computation device 12 to a second computation device 11, the first electronic computation device being designed in accordance with a higher safety integrity level than the second electronic computation device. In principle, alternatively or additionally, the received vehicle-to-X message can be provided to the first and second electronic computation devices in parallel by means of the reception device, resulting potentially in greater time efficiency as a result of the simultaneous processing.

By means of a vehicle-to-X communication protocol stack 11-1, the received vehicle-to-X message is processed to obtain the data included therein. The data is then transmitted to a data memory 11-3 of the second electronic computation device 11, said data memory being used, by way of example, as a database for managing data of the vehicle-to-X communication and being organized accordingly.

Before the data is entered into the database 11-3, the second computation device 11 generates, in a step 3, by means of the vehicle-to-X communication protocol stack 11-1, a new vehicle-to-X message using the data obtained by processing the received vehicle-to-X message, and calculates, according to an identical method as for the first electronic computation device 12, a one-to-one hash value for the generated vehicle-to-X message by means of a hash value determination device 11-2 in a step 4. Said hash value is then transmitted to the first electronic computation device 12. The generation takes place in particular in accordance with the rules of at least one corresponding standard, e.g. IEEE, SAE, ETSI. Alternatively, for the generation of the new vehicle-to-X message, a further implemented vehicle-to-X communication protocol stack can be used, for example in order to achieve parallel processing of incoming messages and those to be generated.

In a step 5, the first electronic computation device 12 makes a comparison between the hash value for the received vehicle-to-X message and the hash value for the generated vehicle-to-X message by means of a comparison device 12-3, and depending on the result of the comparison, wherein the data from the received vehicle-to-X message is expediently provided for further processing, for example by further vehicle systems, but only if a result of the comparison indicates a match between the hash value for the received vehicle-to-X message and the hash value for the generated vehicle-to-X message.

The first electronic computation device 12 transmits a result of the comparison, i.e. whether or not a match was determined, to the second electronic computation device 11. If a match was detected, the data from the received vehicle-to-X message is entered into the database 11-3 in a step 6a; otherwise, in a step 6b, the data is discarded and a diagnosis is optionally performed. Furthermore, the data can be used, for example, by vehicle-to-X application programs 11-4 and/or provided to further vehicle systems by means of a vehicle network 11-5, e.g. a databus, such as CAN, Ethernet or Flexray in particular.

Should it become clear in the course of the procedure that a certain feature or group of features is not absolutely necessary, the applicant has already attempted to formulate at least one independent claim that no longer comprises the feature or the group of features. This can consist for example of a subcombination of a claim made on the filing date or a subcombination of a claim made on the filing date that is restricted by additional features. Such claims or combinations of features to be newly formulated are considered to be covered by the disclosure of this application.

It should also be noted that embodiments, features and variants of the invention, which are described in the various different embodiments or example embodiments and/or are shown in the Figures, can be combined with one another as desired. Individual features or a plurality of features can be exchanged as desired. The resulting combinations of features are considered to be covered by the disclosure of this application.

Back references in dependent claims should not be considered to mean that independent protection of the features of said dependent claims is being forfeited. Said features can also be combined as desired with other features.

Features which are only disclosed in the description or features which are disclosed in the description or in a claim only in connection with other features, can be considered to be significant independently as essential to the invention. They can therefore also be included in the claims individually for delimiting from the prior art.

In general, it should be noted that vehicle-to-X communication is defined in particular as direct communication between vehicles and/or between vehicles and infrastructure devices. For example, it can therefore consist of vehicle-to-vehicle communication or vehicle-to-infrastructure communication. Where reference is made in this application to communication between vehicles, this can be performed in principle for example as part of vehicle-to-vehicle communication, which is typically performed without communication through a mobile network or similar external infrastructure and which therefore should be differentiated from other solutions, which are based on a cellular network for example. For example, vehicle-to-X communication can be performed by using the standard IEEE 802.11p or IEEE 1609.4. Vehicle-to-X communication can also be referred to as C2X communication or V2X communication. The sub-areas can be denoted as C2C (car-to-car), V2V (vehicle-to-vehicle), C2I (car-to-infrastructure) and V2I (vehicle-to-infrastructure). However, the invention does not explicitly exclude vehicle-to-X communication over a cellular network, for example.

The invention claimed is:

1. A vehicle-to-X communication apparatus comprising:
   a reception device including a receiver or a transceiver, the reception device designed to receive a vehicle-to-X message,
   a first electronic computation device designed to calculate a hash value for a received vehicle-to-X message,
   a second electronic computation device designed to generate a new vehicle-to-X message using data included in the received vehicle-to-X message and to calculate a hash value for the generated vehicle-to-X message, wherein
   the first electronic computation device is designed in accordance with a higher safety integrity level than the second electronic computation device, and
   a comparison device designed to make a comparison between the hash value for the received vehicle-to-X message and the hash value for the generated vehicle-to-X message, wherein
   the vehicle-to-X communication apparatus is designed to further process the data from the received vehicle-to-X message depending on a result of the comparison.

2. The vehicle-to-X communication apparatus according to claim 1, designed to further process the data if a result of the comparison indicates a match between the hash value for the received vehicle-to-X message and the hash value for the generated vehicle-to-X message.

3. The vehicle-to-X communication apparatus according to claim 1, wherein the first electronic computation device is designed in accordance with an ASIL B, C or D safety integrity level.

4. The vehicle-to-X communication apparatus according to claim 1, wherein the second electronic computation device is designed in accordance with an ASIL QM safety integrity level.

5. The vehicle-to-X communication apparatus according to claim 1, wherein the second electronic computation device is designed to carry out a vehicle-to-X communication protocol stack and to process the received vehicle-to-X message by means of the vehicle-to-X communication protocol stack.

6. The vehicle-to-X communication apparatus according to claim 5, wherein the vehicle-to-X communication protocol stack is designed in accordance with an ASIL QM safety integrity level.

7. The vehicle-to-X communication apparatus according to claim 5, wherein the second electronic computation device is designed to generate the generated vehicle-to-X message using the data from the received vehicle-to-X message by means of the vehicle-to-X communication protocol stack and/or a further vehicle-to-X communication protocol stack.

8. The vehicle-to-X communication apparatus according to claim 1, wherein the first electronic computation device is designed to store the hash value for the received vehicle-to-X in a data memory.

9. The vehicle-to-X communication apparatus according to claim 1, wherein the second electronic computation device is designed to store the data from the received vehicle-to-X message in a further data memory.

10. The vehicle-to-X communication apparatus according to claim 9, wherein the second electronic computation device is designed to store the data from the received vehicle-to-X message in a further data memory only if the result of the comparison indicates a match between the hash value for the received vehicle-to-X message and the hash value for the generated vehicle-to-X message.

11. The vehicle-to-X communication apparatus according to claim 9, wherein the further data memory is designed as a database for managing data of the vehicle-to-X communication apparatus.

12. The vehicle-to-X communication apparatus according to claim 1, wherein the vehicle-to-X communication apparatus is designed to make the comparison between the hash value for the received vehicle-to-X message and the hash value for the generated vehicle-to-X message by means of the first electronic computation device and/or the second electronic computation device.

13. The vehicle-to-X communication apparatus according to claim 1, wherein the second electronic computation device is designed to transmit the hash value for the generated vehicle-to-X message to the first electronic computation device in order to make the comparison.

14. The vehicle-to-X communication apparatus according to claim 1, wherein the first electronic computation device is designed to transmit the result of the comparison to the second electronic computation device.

15. The vehicle-to-X communication apparatus according to claim 1, wherein the first electronic computation device is designed to determine an identifier for describing a storage location for the hash value on the basis of the received vehicle-to-X message.

16. A vehicle or an infrastructure device comprising the vehicle-to-X communication apparatus according to claim 1.

17. A method for achieving a safety integrity level in vehicle-to-X communication, comprising:
   receiving a vehicle-to-X message by a reception device,
   calculating a hash value for the received vehicle-to-X message by first electronic computation device,
   generating a new vehicle-to-X message using data included in the received vehicle-to-X message, by a second electronic computation device, wherein the first electronic computation device is designed in accordance with a higher safety integrity level than the second electronic computation device,
   calculating a hash value for the generated vehicle-to-X message by the second electronic computation device,
   making a comparison between the hash value for the received vehicle-to-X message and the hash value for the generated vehicle-to-X message by a comparison device, and
   using the data from the received vehicle-to-X message for further processing, depending on a result of the comparison.

18. The vehicle-to-X communication apparatus according to claim 2, wherein the first electronic computation device is designed in accordance with an ASIL B, C or D safety integrity level.

19. The vehicle-to-X communication apparatus according to claim 6, wherein the second electronic computation device is designed to generate the generated vehicle-to-X message using the data from the received vehicle-to-X message by means of the vehicle-to-X communication protocol stack and/or a further vehicle-to-X communication protocol stack.

20. The vehicle-to-X communication apparatus according to claim 10, wherein the further data memory is designed as a database for managing data of the vehicle-to-X communication apparatus.

* * * * *